(No Model.)
W. R. ISBELL.
SPRING WAGON.
No. 302,137. Patented July 15, 1884.
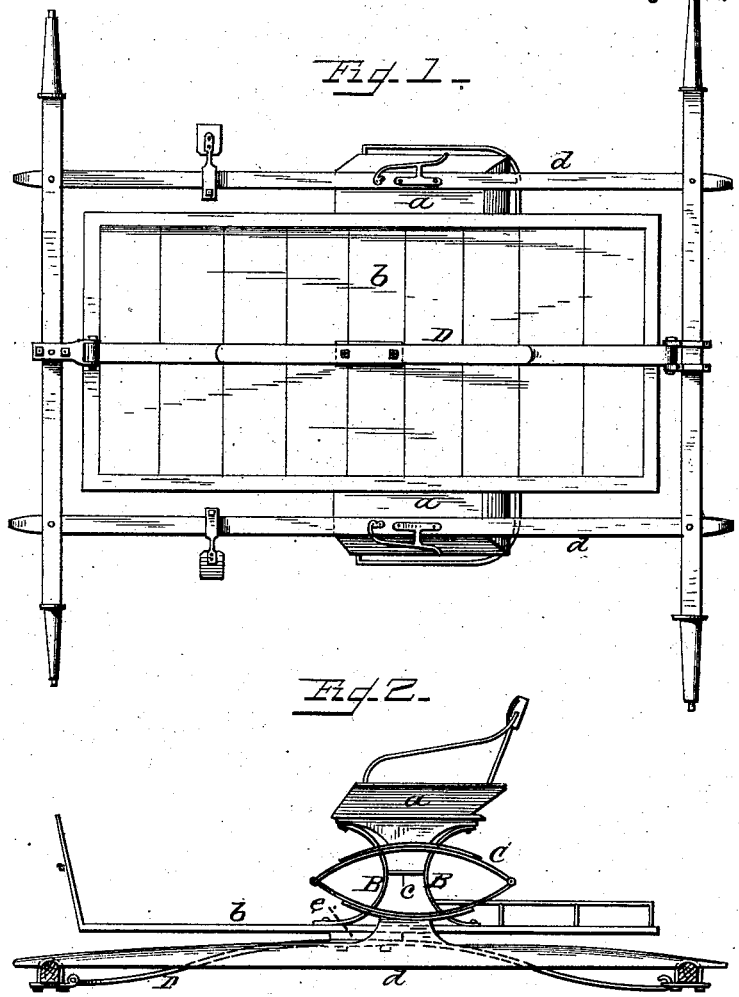
WITNESSES
F. L. Ourand
L. L. Miller
INVENTOR
William R. Isbell,
per Chas. H. Fowler
Attorney

UNITED STATES PATENT OFFICE.

WILLIAM R. ISBELL, OF YORKSHIRE CENTRE, NEW YORK.

SPRING-WAGON.

SPECIFICATION forming part of Letters Patent No. 302,137, dated July 15, 1884.

Application filed May 17, 1884. (No model.)

*To all whom it may concern:*

Be it known that I, WILLIAM R. ISBELL, a citizen of the United States, residing at Yorkshire Centre, in the county of Cattaraugus and State of New York, have invented certain new and useful Improvements in Spring-Wagons; and I do hereby declare that the following is a full, clear, and exact description of the same, reference being had to the annexed drawings, making a part of this specification, and to the letters and figures of reference marked thereon.

Figure 1 of the drawings is an under plan view of a vehicle embodying my invention, and Fig. 2 a side elevation thereof.

The present invention has for its object to improve the construction of spring-wagons, whereby they will possess the requisite strength and still be light, and when passing over any obstruction the platform of the wagon-body will not be thrown up at the front end, but remain level. These objects I attain by the construction substantially as shown in the drawings, and hereinafter described and claimed.

In the accompanying drawings, A represents the wagon or vehicle body, consisting of the seat $a$ and platform $b$, of any of the usual forms, depending entirely upon the style and shape of vehicle used. The seat $a$ is connected to the suspended platform $b$ by curved braces B, joined together near or at their middle by transverse stays $c$. The seat $a$, at its sides, is connected to elliptic springs C, which are in turn connected to the side bars, $d$. The platform $b$ is not connected at either its sides or ends, and the only means of suspension is the central spring-reach, D, secured to the under side of the platform $b$ by an interposed spring-block, $e$.

As will be noticed, there are no end or side springs employed, the spring-reach D acting in place of it, the usual side springs causing side motion, which is objectionable; but with the spring-reach this rocking motion is entirely removed. The spring-reach D is so bent or curved and attached to the axle of the vehicle that when loading the axles are held level.

Having now fully described my invention, what I claim as new, and desire to secure by Letters Patent, is—

A vehicle-body, its seat being connected to the platform by curved braces and to the side bars by elliptic springs, in combination with a spring-reach connected to the under side of the platform by an interposed block and extending along the center thereof, substantially as and for the purpose set forth.

In testimony that I claim the above I have hereunto subscribed my name in the presence of two witnesses.

WILLIAM R. ISBELL.

Witnesses:
E. H. VAN SLYKE,
W. E. BEACH.